(12) United States Patent
Tsai et al.

(10) Patent No.: US 9,894,698 B2
(45) Date of Patent: Feb. 13, 2018

(54) COMMUNICATION SYSTEM, BASE STATION, USER EQUIPMENT, AND DISCOVERY METHOD FOR DEVICE-TO-DEVICE COMMUNICATION

(71) Applicant: Industrial Technology Research Institute, Hsinchu (TW)

(72) Inventors: Hua-Lung Tsai, Taipei (TW); Chorng-Ren Sheu, Kaohsiung (TW); Chun-Yi Wei, New Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 142 days.

(21) Appl. No.: 14/981,949

(22) Filed: Dec. 29, 2015

(65) Prior Publication Data

US 2016/0338122 A1    Nov. 17, 2016

Related U.S. Application Data

(60) Provisional application No. 62/160,621, filed on May 13, 2015.

(30) Foreign Application Priority Data

Dec. 7, 2015  (TW) .............................. 104140919 A

(51) Int. Cl.
*H04W 72/04* (2009.01)
*H04W 72/10* (2009.01)
(Continued)

(52) U.S. Cl.
CPC ............. *H04W 76/023* (2013.01); *H04L 5/00* (2013.01); *H04W 8/005* (2013.01)

(58) Field of Classification Search
None
See application file for complete search history.

(56) References Cited

U.S. PATENT DOCUMENTS 5,214,789 A  5/1993  George
7,383,050 B2  6/2008  Kall et al.
(Continued)

FOREIGN PATENT DOCUMENTS

CN  103997727  8/2014
EP  2763461  8/2014
(Continued)

OTHER PUBLICATIONS

"Office Action of Taiwan Counterpart Application", dated Jan. 24, 2017, p. 1-p. 8.

(Continued)

*Primary Examiner* — Chi H Pham
*Assistant Examiner* — Soon-Dong D Hyun
(74) *Attorney, Agent, or Firm* — JCIPRNET

(57) ABSTRACT

Embodiments of a communication system, a base station (BS), a user equipment (UE), and a discovery method for device-to-device (D2D) communication are provided. The communication system includes a base station and multiple UEs. Each of the UEs uses one of multiple carrier frequency bands for communication. The BS obtains D2D communication requests of the UEs by the carrier frequency bands, and groups the UEs into multiple groups according to locations of the UEs. The BS allocates a discovery resource pool of a predefined carrier frequency band to the UEs in the same group and enables each of the UEs to transmit a discovery message corresponding to each of the UEs' own in the discovery resource pool.

35 Claims, 4 Drawing Sheets

(51) Int. Cl.
*H04W 76/02* (2009.01)
*H04W 8/00* (2009.01)
*H04L 5/00* (2006.01)

(56) References Cited

U.S. PATENT DOCUMENTS

| | | | |
|---|---|---|---|
| 8,359,038 | B2 | 1/2013 | Hakola et al. |
| 8,498,255 | B2 | 7/2013 | Wang et al. |
| 8,559,950 | B2 | 10/2013 | Choi et al. |
| 8,780,835 | B2 | 7/2014 | Hakola et al. |
| 8,817,623 | B2 | 8/2014 | Gupta et al. |
| 8,861,452 | B2 | 10/2014 | Barbieri et al. |
| 8,885,507 | B2 | 11/2014 | Chen et al. |
| 8,917,708 | B2 | 12/2014 | Venkatachalam et al. |
| 8,965,377 | B2 | 2/2015 | Zhang et al. |
| 8,995,370 | B2 | 3/2015 | Pelletier et al. |
| 9,020,465 | B2 | 4/2015 | Nousiainen et al. |
| 9,036,603 | B2 | 5/2015 | Johnsson et al. |
| 2013/0022010 | A1 | 1/2013 | Qianxi et al. |
| 2013/0109301 | A1 | 5/2013 | Hakola et al. |
| 2013/0157676 | A1 | 6/2013 | Baek et al. |
| 2014/0003262 | A1* | 1/2014 | He .................. H04W 28/08 370/252 |
| 2014/0112194 | A1 | 4/2014 | Novlan et al. |
| 2014/0206348 | A1* | 7/2014 | Johnsson ............ H04W 8/005 455/434 |
| 2014/0211705 | A1 | 7/2014 | Baek |
| 2014/0248901 | A1* | 9/2014 | Johnsson ............ H04W 64/00 455/456.1 |
| 2014/0254523 | A1 | 9/2014 | Chai et al. |
| 2015/0009910 | A1 | 1/2015 | Ryu et al. |
| 2015/0016357 | A1* | 1/2015 | Yie .................. H04W 76/023 370/329 |
| 2015/0189487 | A1* | 7/2015 | Morita ............ H04W 52/0225 455/434 |
| 2015/0201392 | A1 | 7/2015 | Sartori et al. |
| 2015/0327311 | A1* | 11/2015 | Wei .................. H04L 12/6418 370/329 |
| 2016/0374105 | A1* | 12/2016 | Kalhan ............ H04W 72/1278 |

FOREIGN PATENT DOCUMENTS

| | | |
|---|---|---|
| TW | 201528863 | 7/2015 |
| TW | 201531134 | 8/2015 |
| WO | 2012159270 | 11/2012 |
| WO | 2014113537 | 7/2014 |
| WO | 2014148859 | 9/2014 |
| WO | 2014169695 | 10/2014 |
| WO | 2014179989 | 11/2014 |

OTHER PUBLICATIONS

Tsolkas et al., "A device discovery scheme for proximity services in LTE networks", 2014 IEEE Symposium on computers and Communication (ISCC), Jun. 23-26, 2014, p. 1-6.
Prasad et al., "Energy-Efficient D2D Discovery for Proximity Services in 3GPP LTE-Advanced Networks: ProSe Discovery Mechanisms", Vehicular Technology Magazine, IEEE, Dec. 2014, p. 40-50.
Choi et al., "Device-to-Device Discovery for Proximity-Based Service in LTE-Advanced System", IEEE Journal on Selected Areas in Communications, Nov. 11, 2014, p. 55-66.
Nguyen et al., "Network-assisted device discovery for LTE-based D2D communication systems", 2014 IEEE International Conference on Communications (ICC), Jun. 10-14, 2014, p. 3160-3165.
Kim et al., "Discovery resource grouping for D2D discovery for mitigation of in-band emission in LTE-Advanced", Globecom Workshops (GC Wkshps), 2014, Dec. 8-12, 2014, p. 869-874.
Venkatasubramanian et al., "Centralized and decentralized multi-cell D2D resource allocation using flexible ULA DL TDD", Wireless Communications and Networking Conference Workshops (WCNWC), 2015 IEEE, Mar. 9-12, 2015, p. 305-310.
S2-142228 "Extended ProSe WID" , Qualcomm, 3GPP TSG SA WG2 Meeting #103 Phoenix, Arizona, USA, May 19-23, 2014, pp. 1-5.
Li et al, "CA-P2P: Context-Aware Proximity-Based Peer-to-Peer Wireless Communications", IEEE Communications Magazine, Jun. 2014, pp. 32-41.
Wang et al., "Delay-Aware Cross-Layer Design for Device-to-Device Communications in Future Cellular Systems", IEEE Communications Magazine, Jun. 2014, pp. 133-139.
Wang et al., "Resource Allocation in Central-Controlled Device-to-Device Communications Networks", IEEE Globecom 2013—Wireless Networking Symposium, Dec. 2013, pp. 4871-4876.
Gao et al., Radio resource management of D2D communication, Proceedings of the 2014 IEEE ICCS, Nov. 2014, pp. 6-10.
Lu et al., Application-Aware Opportunistic D2D Link Schedulers: Traffic Offloading and User Perceived QoS, retrieved from http://users.ece.utexas.edu/~gustavo/papers/LuD14.pdf, 2014.
Tiirola et al., "On the Design of Discovery Patterns for Half-Duplex TDD Nodes Operating in Frame-Based Systems", IEEE Future Network and Mobile Summit (FutureNetworkSummit), 2013, Jul. 2013, pp. 1-9.
Feng, "Device-to-Device Communications in LTE-Advanced Network. Networking and Internet Architecture", Telecom Bretagne, Universite de Bretagne-Sud, 2013, pp. 1-155.
Lu et al., "Application-Aware Opportunistic D2D Link Schedulers: Traffic Offloading and User Perceived QoS", retrieved from http://users.ece.utexas.edu/~gustavo/papers/LuD14.pdf, 2014, pp. 1-14.
Mumtaz et al., "Energy Efficient Interference-Aware Resource Allocation in LTE-D2D Communication", 2014 IEEE International Conference on Communications (ICC), Jun. 10-14, 2014, pp. 282-287.
Tiirola et al., "On the Design of Discovery Patterns for Half-Duplex TDD Nodes Operating in Frame-Based Systems", Future Network & Mobile Summit 2013 Conference Proceedings, Jul. 1-9, 2013, pp. 1-9.
Xu et al., "Resource Management for Deviceto-Device Underlay Communication", arxiv.org/pdf/1311.1018, Nov. 5, 2013, pp. 1-84.

* cited by examiner

COMMUNICATION SYSTEM, BASE STATION, USER EQUIPMENT, AND DISCOVERY METHOD FOR DEVICE-TO-DEVICE COMMUNICATION

CROSS-REFERENCE TO RELATED APPLICATION

This application claims the priority benefits of U.S. provisional application Ser. No. 62/160,621, filed on May 13, 2015 and Taiwan application Ser. No. 104140919, filed on Dec. 7, 2015. The entirety of each of the above-mentioned patent applications is hereby incorporated by reference herein and made a part of this specification.

TECHNICAL FIELD

The present disclosure relates to a device-to-device (D2D) communication technology, and more particularly, to a communication system, a base station, a user equipment and a discovery method for device-to-device communication.

BACKGROUND

Core network is often required for transmission in conventional wireless communication technology but resulting in the problem of core network congestion. Therefore, a direct communication technology that works without going through a base station has been receiving more attention lately. Device-to-device (D2D) communication is a technology that enables direct communication among user equipments (UEs) in which use of the base station (e.g., eNodeB or enhanced NodeB) for forwarding data is not required. Application of D2D communication may be classified as proximity-based service (PBS; ProSe; or known as Proximity Communication), which is a service applicable only for the user equipments near one another. D2D communication mainly includes three major procedures: Device Discovery, D2D peering and communication.

On the other hand, public land mobile network (PLMN) established by each mobile communication provider could provide a communication service for users. Communication interface and frequency band used by each mobile communication provider are different from the others to avoid issues such as mutual interference and the like. FIG. 1 is a schematic diagram of a communication system 100. A base station 110 and a base station 120 respectively belong to PLMNs of different mobile communication providers. Various user equipments 11 to 13, 21 to 23 and 31 to 33 are included within a communication range R1 of the base station 110 and a communication range R2 of the base station 120. Nonetheless, the user equipments may use services of different mobile communication providers, and the PLMN of each of the mobile communication providers may also include a communication interface and a carrier frequency band which are different from the others. For example, the user equipments 11 and 12 may use a mobile network service provided by the base station 110 by the carrier frequency band 1800 MHz while the user equipment 13 uses a mobile network service provided by the base station 120 by the carrier frequency band 700 MHz, and thus the user equipment 11 cannot learn of information related to the user equipment 13 across the frequency bands. As a result, the D2D communication is still only available for the user equipments belonging to the same mobile communication provider at present since the user equipments are unable to overcome restrictions across the mobile communication providers and the carrier frequency bands for conducting the D2D communication.

SUMMARY

Embodiments of the present disclosure disclose a communication system, a base station, a user equipment, and a discovery method for device-to-device communication.

A communication system disclosed by the present disclosure includes a base station. The base station serves a plurality of user equipments within a transmission range of the base station. Each of the user equipments uses one of a plurality of carrier frequency bands for communication. The base station obtains device-to-device communication requests of the user equipments by the carrier frequency bands, and groups the user equipments into a plurality of groups according to locations of the user equipments. The base station allocates a discovery resource pool of a predefined carrier frequency band to the user equipments in the same group and enables each of the user equipments to transmit a discovery message corresponding to each of the user equipments' own in the discovery resource pool.

An embodiment of a user equipment disclosed by the present disclosure includes a transceiver and a processor. The transceiver is configured to transceive wireless data for communication by one of a plurality of carrier frequency bands. The processor is operatively coupled to the transceiver. The processor transmits a device-to-device communication request of the user equipment by the transceiver to a base station and obtains a resource pool message by the transceiver from the base station. The resource pool message is configured to allocate a discovery resource pool of a predefined carrier frequency band to the user equipments in a group. The user equipments in each group are geographically close to one another. The processor transmits a discovery message of the user equipment in the discovery resource pool by the transceiver.

An embodiment of another user equipment disclosed by the present disclosure includes a transceiver and a processor. The transceiver is configured to transceive wireless data for communication by one of a plurality of carrier frequency bands. The processor is operatively coupled to the transceiver. The processor transmits a device-to-device communication request of the user equipment by the transceiver to a base station and obtains a resource pool message by the transceiver from the base station. The resource pool message is configured to allocate a discovery resource pool of a predefined carrier frequency band to the user equipments in a group. The user equipments in each group are geographically close to one another, and the user equipment has a priority message corresponding to the discovery resource pool. The processor monitors the predefined carrier frequency band and selectively receives discovery messages of other user equipments according to the priority message by the transceiver.

An embodiment of a base station disclosed by the present disclosure includes a transmitter and a receiver. The transmitter and the receiver are respectively configured to transceive wireless data for communication by one of a plurality of carrier frequency bands. The processing circuit is operatively coupled to the transmitter and the receiver. The processing circuit obtains device-to-device communication requests of a plurality of user equipments by the carrier frequency bands by the receiver, groups the user equipments into a plurality of groups according to locations of the user equipments, and allocates a discovery resource pool within a predefined carrier frequency band by the transmitter to the user equipments in the same group.

A discovery method for device-to-device communication disclosed by the present disclosure is adapted to a base station. An embodiment of the discovery method includes the following steps. Device-to-device communication requests of a plurality of user equipments are obtained by a plurality of carrier frequency bands. Herein, the base station uses one of the carrier frequency bands to communicate with the user equipments. The user equipments are grouped into a plurality of groups according to locations of the user equipments. Also, a discovery resource pool within a predefined carrier frequency band is allocated to the user equipments in the same group.

A discovery method for device-to-device communication disclosed by the present disclosure is adapted to a user equipment. An embodiment of the discovery method includes the following steps. A device-to-device communication request of the user equipment is transmitted to a base station. An resource pool message is obtained from the base station. Herein, the resource pool message is configured to allocate a resource pool of a predefined carrier frequency band to the user equipment in the same group, and the user equipments in each group are geographically close to one another. The discovery message of the user equipment is transmitted in the discovery resource pool.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
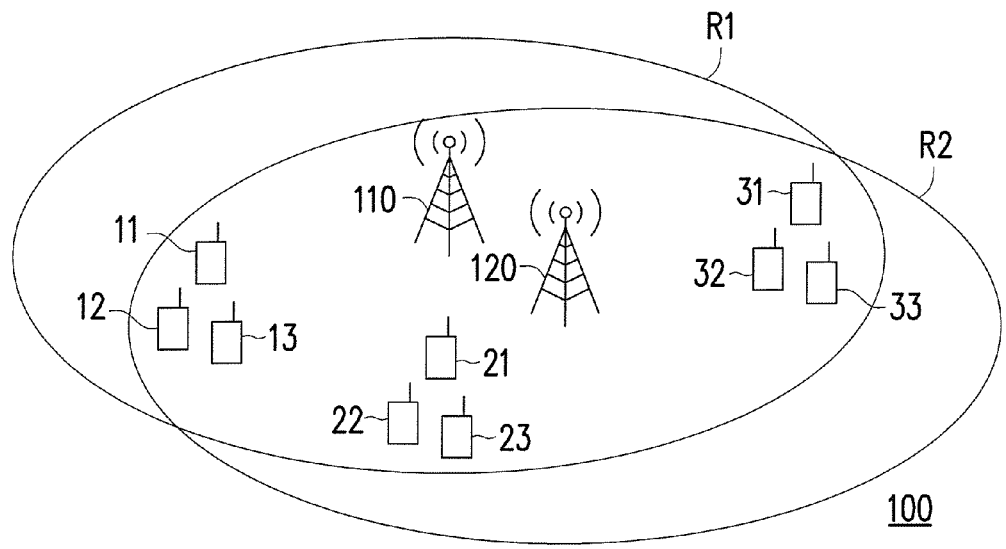
FIG. 1 is a schematic diagram of a communication system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
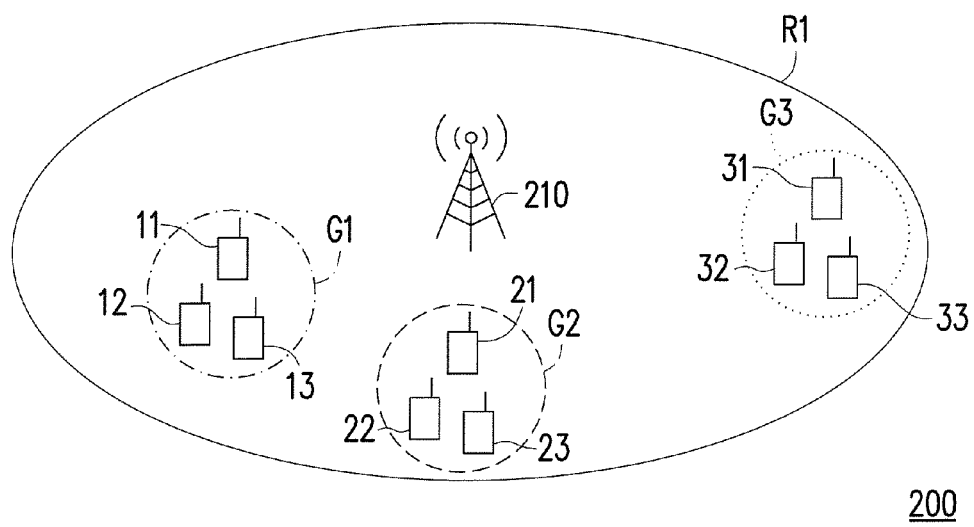
FIG. 2 is a schematic diagram of a communication system according to an embodiment of the disclosure.

FIG. 2 is a schematic diagram of a communication system 200 according to an embodiment of the present disclosure. As shown in FIG. 2, the communication system 200 includes a base station 210 and a plurality of user equipments 11 to 13, 21 to 23 and 31 to 33 in which a part of user equipments among those user equipments belongs to different mobile communication providers. The user equipments 11 to 13, 21 to 23 and 31 to 33 are located within a transmission range of the base station 210. In order to clearly describe this embodiment of the present disclosure, it is assumed that: locations of the user equipments 11 to 13 are geographical close to one another; locations of the user equipments 21 to 23 are geographical close to one another.

and locations of the user equipments 31 to 33 are geographical close to one another.

The base station 210 according to the present disclosure may be Evolved Node B (eNB or eNodeB) which has a communication range being R1. In other embodiments, the base station 210 may also be implemented by selecting and using technology or hardware of other types. For example, the base station 210 of other types may be advanced base station (ABS), base transceiver system (BTS), access point, home base station, relay, intermediate node, intermediate equipment, satellite-based communication base station, Mobility Management Entity (MME), Serving Gateway (S-GW), Packet Data Network Gateway (PDN-GW), Serving GPRS Support Node (SGSN), Gateway GPRS Support Node (GGSN), Mobile Switching Center (MSC) and Home Subscriber Server (HSS) or nodes for maintaining database related to user information. A mobile network technology used by the base station 210 may be Long Term Evolution (LTE) technology. The user equipments 11 to 13, 21 to 23 and 31 to 33 according to the present disclosure may adopt both LTE and D2D direct communication technologies.

The user equipments 11 to 13, 21 to 23 and 31 to 33 may represent various electronic equipments, which may include (but not limited to), for example, mobile station, advanced mobile station (AMS), server, user terminal, desktop computer, laptop computer, network computer, work station, personal digital assistant (PDA), tablet computer, scanner, telephone device, pager, camera, television, hand-held video game, music device, wireless sensor and the like.

In this embodiment of the present disclosure, the communication system 200 could group the user equipments 11 to 13, 21 to 23 and 31 to 33 belonging to the different mobile communication providers together, so that these user equipments 11 to 13, 21 to 23 and 31 to 33 could perform a device discovery for a proximity-based service (ProSe) D2D communication across different carrier frequency bands and PLMN equipments. According to an embodiment of the present disclosure, the base station 210 obtains D2D communication requests of these user equipments 11 to 13, 21 to 23 and 31 to 33 by a plurality of carrier frequency bands of the mobile communication providers. Different carrier frequency bands and transmission parameters may belong to different mobile communication providers, and each of the user equipments 11 to 13, 21 to 23 and 31 to 33 may use a mobile communication service of one of the mobile communication providers. Therefore, in order to overcome the restrictions across the carrier frequency bands and the PLMNs, the base station 210 receives the D2D communication requests of the user equipments 11 to 13, 21 to 23 and 31 to 33 by all known carrier frequency bands. In some embodiments, the base station 210 may also be composed of a plurality of control nodes from different PLMNs. Each of these control nodes transmits the D2D communication requests sent by the user equipments in the respective PLMN to the specific base station 210 through a core network or the Internet.

After receiving the D2D communication requests of the user equipments 11 to 13, 21 to 23 and 31 to 33, the base station 210 groups the user equipments 11 to 13, 21 to 23 and 31 to 33 into a plurality of groups according to the geographical locations of the user equipments 11 to 13, 21 to 23 and 31 to 33. In the present embodiment, three groups G1 to G3 are taken as an example. Because the D2D communication belongs to ProSe, it is required that two user equipments are close to each other. Accordingly, the base station 210 groups the user equipments close to each other into the same group. For example, the base station 210 groups the user equipments 11 to 13 into the group G1, groups the user equipments 21 to 23 into the group G2, and groups the user equipments 31 to 33 into the group G3. In other words, the user equipments in each of the groups G1 to G3 are geographically close to one another.

Figure 3:
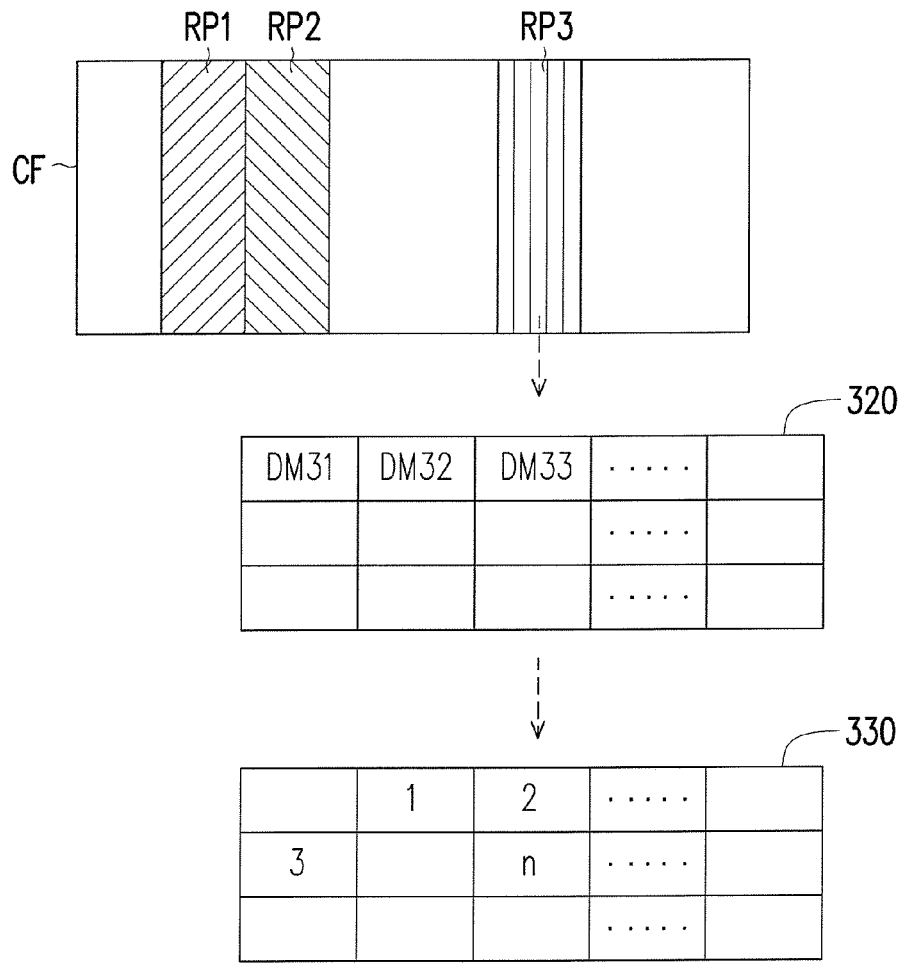
FIG. 3 is a schematic diagram illustrating an embodiment of a predefined carrier frequency, a resource allocation message and a priority message.

After geographically grouping the user equipments, the base station 210 allocates a discovery resource pool within a predefined carrier frequency band CF to the user equipments in the same group. FIG. 3 is a schematic diagram illustrating an embodiment of the predefined carrier frequency CF, a resource allocation message and a priority message. Referring to FIG. 2 and FIG. 3, the base station 210 may select one of the carrier frequency bands corresponding to the PLMNs to serve as the predefined carrier frequency band CF and may also use a public carrier frequency band to serve as the predefined carrier frequency band CF. In some embodiments, the base station 210 may also use System information block (SIB), Radio Resource Control (RRC) protocol or Physical Downlink Shared Channel (PDSCH) to notify each of the user equipments 11 to 13, 21 to 23 and 31 to 33 regarding the predefined carrier frequency band CF and a message of the corresponding discovery resource pool. The message of the discovery resource pool may also be referred to as a resource pool message. Herein, the base station 210 could select one of blocks in the predefined carrier frequency band CF to serve as one source pool to, for example, allocate a resource pool RP1 to the user equipments 11 to 13 in the group G1; allocate a resource pool RP2 to the user equipments 21 to 23 in the group G2; and allocate a resource pool RP3 to the user equipments 31 to 33 in the group G3. Because these resource pools RP1, RP2 and RP3 are provided to the user equipments 11 to 13, 21 to 23 and 31 to 33 for use of transmitting a discovery message in the D2D communication, these resource pools may also be referred to as discovery resource pools RP1, RP2 and RP3.

After the resource pool is known by each of the user equipments in each of the groups, the discovery message corresponding to each user equipment is transmitted to the other user equipments according to the resource allocation message provided by the base station 210. In an embodiment, the base station 210 could notify the corresponding user equipment regarding such resource allocation message by using System information block (SIB), Radio Resource Control (RRC) protocol or Physical Downlink Shared Channel (PDSCH). Herein, the group G3 and the user equipments 31 to 33 therein are used as an example. The base station 210 in the embodiment of FIG. 2 transmits the resource allocation message (e.g., a table 320 depicted in FIG. 3) corresponding to the resource pool RP3 to the user equipments 31 to 33 in the group G3.

The resource allocation message (the table 320) will be described in more details below. A communication technology used by the base station 210 could divide each of the discovery resource pools into a plurality of resource blocks, and each of the resource blocks may be allocated to the different user equipment for transmitting the corresponding discovery message. For example, the table 320 corresponding to the resource pool RP3 sequentially enables the user equipments 11, 12 and 13 to transmit discovery messages DM11, DM12 and DM13, respectively. In this way, the user equipment served to transmit the discovery message may know in which of the resource blocks the discovery message of the D2D could be transmitted without interfering with the other user equipment.

To allow the user equipment to selectively receive and decode a desired discovery message while ignoring an unrelated discovery message, priority messages corresponding to different resource pools may further be provided for each of the user equipments in an embodiment of the present disclosure, so that the user equipment could determine whether to receive and analyze the discovery messages within the resource blocks in the table 320 according to priority values of the priority messages. The priority message may be shown as a table 330 in the embodiment of FIG. 3. The priority message (the table 330) may include a plurality of priority values (e.g., values "1", "2", "3", "n" in the table 330, where n is a positive integer) respectively included for each of the resource blocks in table 320. Because the table 330 is corresponding to the table 320 of the resource pool RP3, the priority message is to be provided to one of the user equipments 31 to 33 (herein, it is assumed to be provided to the user equipment 31). In this example, when the priority value is smaller, the user equipment 31 preferentially receives and analyzes the discovery message in the resource block of the resource pool RP3 corresponding to such priority value. For example, after referring to the priority message (the table 330), the user equipment 31 preferentially receives and analyzes the discovery message DM32 before the discovery message DM33 could take the second priority order. Accordingly, the user equipment 31 does not need to receive and analyze all of the discovery messages in the resource blocks of the resource pool RP3 one by one but selectively ignores or delays receiving the discovery messages with no priority, to improve usability of the user equipments in the ProSe D2D communication.

In the present disclosure, the priority message may be preset in the user equipments. For instance, the user equipments 31 to 33 may be preset to receive and analyze the first five resource blocks with the highest priority values in the resource pool RP3. On the other hand, the priority message of the present disclosure may also be dynamically adjusted according to actual situations in the D2D communication and transmitted to different user equipments by the base station 210. For instance, the base station 210 may check a type of the D2D communication requests of the user equipments. If the type of the D2D communication request is a special type of public safety, the base station 210 could set the priority value of the resource block corresponding to such D2D communication request as the highest (e.g., a value "1") and provide the adjsuted priority message to each of the user equipments by a synchronous transmission protocol (e.g., System information block (SIB), Radio Resource Control (RRC) protocol or Physical Downlink Shared Channel (PDSCH)). The priority message of the present disclosure may be presented by the table 330, and it is also possible that the base station 210 only transmits one or more priority valuers (e.g., only the priority values "1", "2", "n" and their corresponding table fields) to the corresponding user equipment in order to update the table 330. In other words, this embodiment of the present disclosure is not intended to limit a presenting method and a transmission method for the priority message, and those applying the present embodiment may perform information transmission and message update based on their own settings.

In the present disclosure, the priority values in the priority message may be determined according to a type of communication purpose of the user equipments transmitting the discovery messages, a type of public land mobile network or message strengths of the discovery messages. The type of communication purpose mainly includes a public safety type and a non-public safety type. When the type of communication purpose of the user equipment is the public safety type, it means that the user of the user equipment encounters emergency accident and requires assistance from other people, so the D2D communication is thus used for searching and discovering for assistance from the nearby personnel. Therefore, the discovery message for announcing the D2D communication with the type of communication purpose being the public safety type needs to be the highest priority value. The type of public land mobile network relates to the public land mobile network where the user equipment is located. For example, when the user equipment 31 located in a PLMN1 intends to communicate with the user equipment (e.g., the user equipment 32) that also belongs to the PLMN1, while generating or updating the priority message, the priority values of other user equipments having the same PLMN type as the user equipment 31 may be increased, for enabling multiple user equipments of the same PLMN type to conduct the D2D communication. The base station 210 may transmit a message related to the PLMN to each of the user equipments by SIB 19.

The priority values in the priority message may also be determined according to the message strengths of the discovery messages. Although the user equipments geographically close to one another are already grouped by the base station 210, each of the user equipments in the same group could still have different distances from one another. Therefore, signal strength of each of the resource blocks in the discovery resource pool may be measured according to Reference Signal Receiving Power (RSRP) technology or Reference Signal Receiving Quality (RSRQ) technology, to dynamically adjust each of the priority values in the priority message. The user equipments could be informed of the message strengths of the discovery messages by a signal strength measurement. On the other hand, the user equipment could obtain the strongest signal strength while receiving the discovery message from the closest user equipment, and thus the neighboring user equipments could discover one another as soon as possible so that the D2D communication may be conducted faster.

Figure 4:
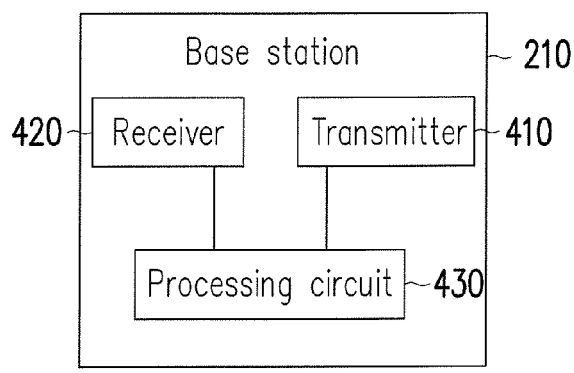
FIG. 4 is a functional block diagram of a base station according to an embodiment of the present disclosure.
Figure 5:
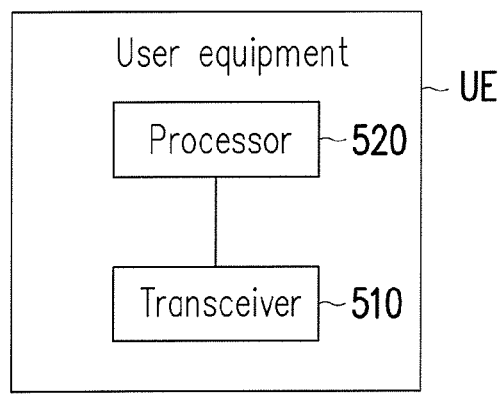
FIG. 5 is a functional block diagram of a user equipment according to an embodiment of the present disclosure.

FIG. 4 is a functional block diagram of a base station 210 according to an embodiment of the present disclosure. The base station 210 mainly includes a transmitter 410, a receiver 420 and a processing circuit 430. The transmitter 410 and the receiver 420 are respectively configured to transceive wireless data for communication by one of a plurality of carrier frequency bands. The transmitter 410 and the receiver 420 may include an antenna corresponding to the carrier frequency band and a control chip. The processing circuit 430 is operatively coupled to the transmitter 410 and the receiver 420 in order to execute corresponding actions and processes related to the base station 210 in the embodiments of the present disclosure. FIG. 5 is a functional block diagram of a user equipment UE according to an embodiment of the present disclosure. Herein, the user equipment UE is an instance of the user equipments 11 to 13, 21 to 23 and 31 to 33 in FIG. 2. The user equipment UE includes a transceiver 510 and a processor 520. The transceiver 510 may include an antenna corresponding to the carrier frequency band and a control chip. The transceiver 510 transceives wireless data for communication by one of a plurality of carrier frequency bands. The processor 520 is operatively coupled to the transceiver 510 in order to execute corresponding actions and processes related to the user equipment UE in the embodiments of the present disclosure.

Figure 6:
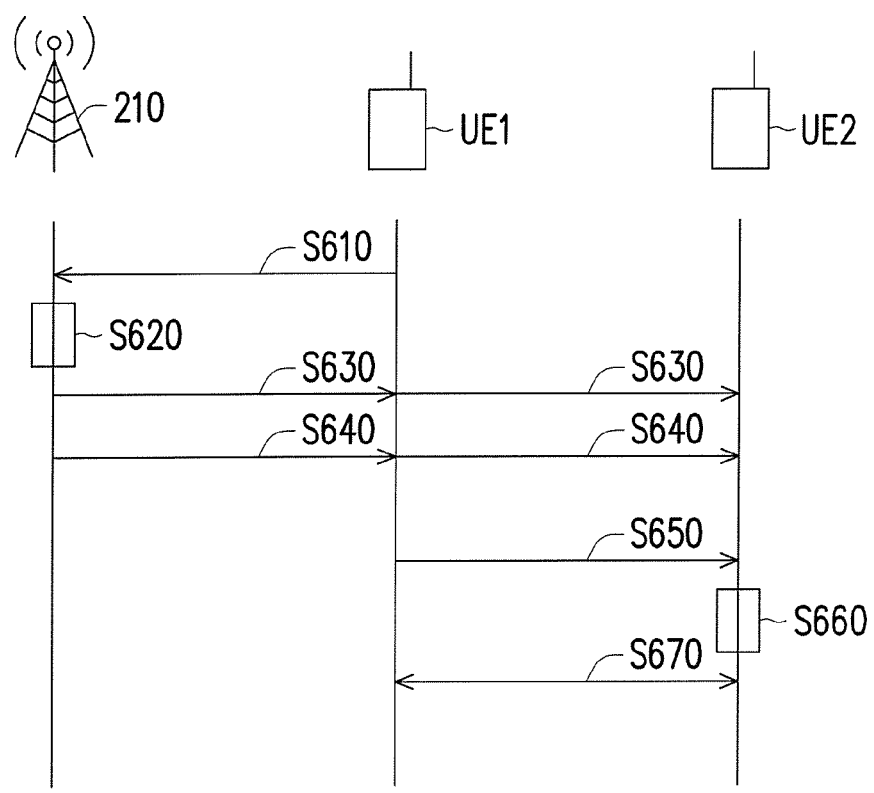
FIG. 6 is a schematic diagram illustrating processes in a discovery method for device-to-device communication according to an embodiment of the present disclosure.

FIG. 6 is a schematic diagram illustrating processes in a discovery method for device-to-device communication according to an embodiment of the present disclosure, which is adapted to the communication system 200 of FIG. 2. Referring to FIG. 6, FIG. 6 mainly illustrates the base station 210, a user equipment UE1 for transmitting a discovery message and a user equipment UE2 for receiving the discovery message. In step S610, the processing circuit of the base station 210 obtains device-to-device communication requests of a plurality of user equipments (e.g., the user equipment UE1) by a plurality of carrier frequency bands by the receiver. In other words, the processor of the user equipment UE1 transmits the device-to-device communication request of the user equipment UE1 by the transceiver thereof to the base station 210.

In step S620, the processing circuit of the base station 210 groups the user equipments into a plurality of groups according to locations of the user equipments within a transmission range of the base station. In step S630, the processing circuit of the base station 210 allocates a discovery resource pool within a predefined carrier frequency band by the transmitter thereof to the user equipments UE1 and UE2 in the same group. Herein, it is assumed that the user equipments are close to one another and grouped into the same group. In other words, the user equipments UE1 and UE2 respectively obtain an resource pool message by their own transceivers, respectively, from the base station 210. The resource pool message is configured to allocate the discovery resource pool of the predefined carrier frequency band to the user equipments in the same group. In this way, the discovery method for device-to-device communication in the embodiments of the present disclosure may be implemented by steps S610 to S630.

Step S640 to step S670 in FIG. 6 are used to further describe additional functions in the discovery method for device-to-device communication in the embodiments of the present disclosure. For example, the user equipments UE1 and UE2 could selectively receive the discovery message according to the priority message of the discovery resource pool. In step S640, the base station 210 may further provide a priority message to each of the user equipments UE1 and UE2 by using System information block (SIB), Radio Resource Control (RRC) protocol or Physical Downlink Shared Channel (PDSCH). In some embodiments, it is also possible that step S640 is not performed since the priority message may already be preset in each of the user equipments UE1 and UE2.

In step S650, the processor of the user equipment UE1 transmits the discovery message of the user equipment UE1 in the discovery resource pool by the transceiver thereof. In step S660, the processor of the user equipment UE2 monitors the predefined carrier frequency band and selectively receives the discovery messages of the other user equipments according to the priority message by the transceiver thereof. In step S670, the user equipment UE2 could discover the other user equipments (e.g., the user equipment UE1) to which the ProSe device-to-device communication could be performed according to the received discovery message, so that the user equipments UE1 and UE2 may conduct the D2D communication with each other without using the base station 210 as intermediary. Detailed operating methods for each of steps in this embodiment of the present disclosure have been described in the foregoing embodiments.

Figure 7:
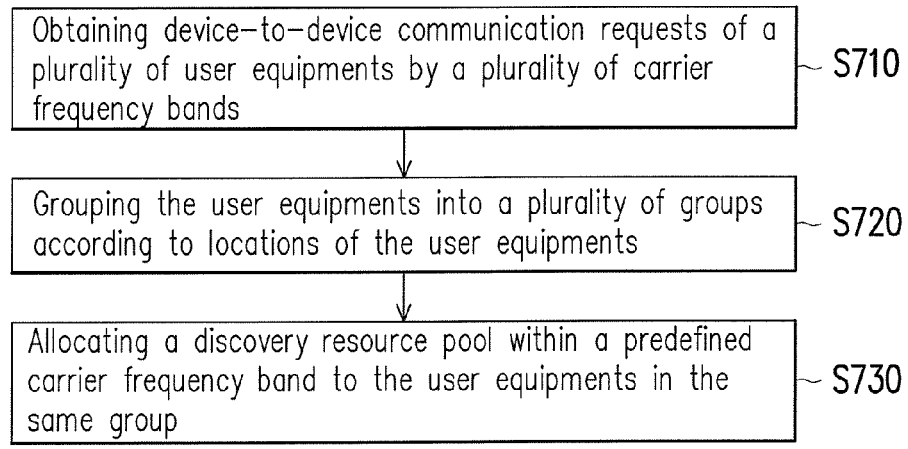
FIG. 7 is a flowchart of steps in an embodiment of the discovery method for device-to-device communication of FIG. 6 for the base station.

FIG. 7 is a flowchart of steps in an embodiment of the discovery method for device-to-device communication of FIG. 6 for the base station 210. In step S710, the processing circuit 430 obtains device-to-device communication requests of a plurality of user equipments by a plurality of carrier frequency bands by the receiver 420. In step S720, the processing circuit 430 groups the user equipments into a plurality of groups according to locations of the user equipments. In step S730, the processing circuit 430 allocates a discovery resource pool within a predefined carrier frequency band by the transmitter 410 to the user equipments in the same group. In an embodiment, the processing circuit 430 could provide the priority message by the transmitter 410 to each of the user equipments. Detailed operating methods for each of steps in this embodiment of the present disclosure have been described in the foregoing embodiments.

Figure 8:
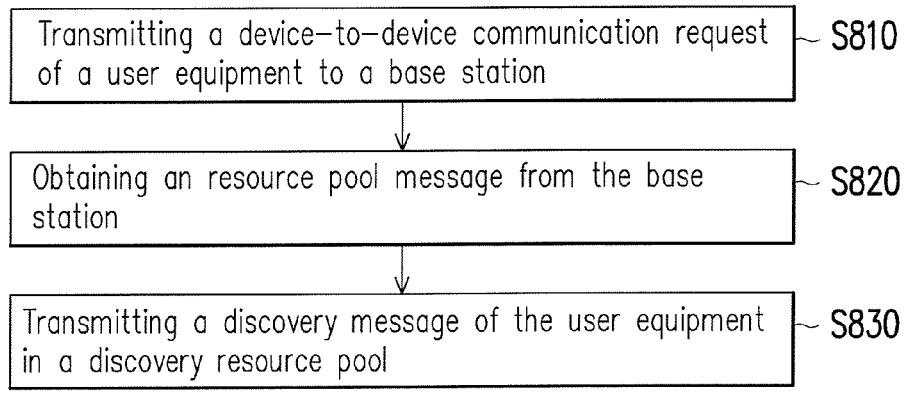
FIG. 8 is a flowchart of steps in an embodiment of the discovery method for device-to-device communication of FIG. 6 for the user equipment UE1.

FIG. 8 is a flowchart of steps in an embodiment of the discovery method for device-to-device communication of FIG. 6 for the user equipment UE1. In step S810, the processor of the user equipment UE1 transmits a device-to-device communication request of the user equipment UE1 to the base station 210. In step S820, the user equipment UE1 obtains an resource pool message from the base station 210, and the resource pool message is configured to allocate a discovery resource pool of a predefined carrier frequency band to the user equipments in the same group. In step S830, the processor of the user equipment UE1 transmits a discovery message of the user equipment UE1 in the discovery resource pool. Detailed operating methods for each of steps in this embodiment of the present disclosure have been described in the foregoing embodiments.

Figure 9:
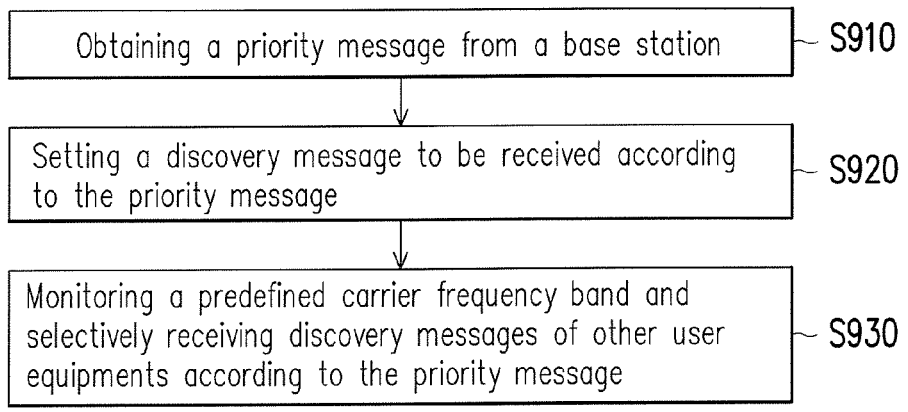
FIG. 9 is a flowchart of steps in an embodiment of the discovery method for device-to-device communication of FIG. 6 for the user equipment UE2.

FIG. 9 is a flowchart of steps in an embodiment of the discovery method for device-to-device communication of FIG. 6 for the user equipment UE2. In step S910, the user equipment UE2 obtains a priority message from the base station 210. In step S920, the user equipment UE2 sets a discovery message to be received according to the priority message. In step S930, the user equipment UE2 monitors a predefined carrier frequency band and selectively receives discovery messages of other user equipments according to the priority message. Detailed operating methods for each of steps in this embodiment of the present disclosure have been described in the foregoing embodiments.

In summary, the communication system and the discovery method in the embodiments of the present disclosure are capable of geographically grouping the user equipment into different groups, so that the user equipments belonging to the different mobile communication providers could perform the device discovery for the ProSe D2D communication across the different carrier frequency bands and PLMN equipments. The user equipment could also selectively receive and decode the desired discovery message according to the priority message belonging to the discovery resource pool while ignoring the unrelated discovery message, to improve usability of the user equipments when performing the proximity-based service.

It will be apparent to those skilled in the art that various modifications and variations could be made to the disclosed embodiments. It is intended that the specification and examples be considered as exemplary only, with a true scope of the disclosure being indicated by the following claims and their equivalents.

The invention claimed is:

1. A communication system, comprising:
a base station, including a transmitter and a receiver, the base station serves a plurality of user equipments within a transmission range of the base station, wherein each of the user equipments uses one of a plurality of carrier frequency bands for communication,
wherein the base station enable the receiver to obtain device-to-device communication requests of the user equipments by the carrier frequency bands and groups the user equipments into a plurality of groups according to locations of the user equipments,
the base station allocates a discovery resource pool of a predefined carrier frequency band to the user equipments in a same group and enables each of the user equipments to transmit a discovery message corresponding to each of the user equipments' own in the discovery resource pool by the transmitter, and
each of the user equipments has a priority message corresponding to the discovery resource pool and selectively receives the discovery messages according to the priority message.

2. The communication system according to claim 1, wherein the carrier frequency bands respectively belong to a plurality of mobile communication providers, and the plurality of user equipments use mobile communication services of the mobile communication providers, wherein a part of user equipments among the plurality of user equipments belongs to different mobile communication providers.

3. The communication system according to claim 1, wherein the user equipments in the same group are geographically close to one another.

4. The communication system according to claim 1, wherein the priority message is preset in the user equipments.

5. The communication system according to claim 1, wherein the base station provides the priority message to the user equipments by a synchronous transmission protocol.

6. The communication system according to claim 1, wherein the discovery resource pool is divided into a plurality of resource blocks, and the priority message of each of the user equipments comprises a plurality of priority values respectively included for the resource blocks,
wherein the user equipments determine whether to receive and analyze the discovery messages within the resource blocks according to the priority values.

7. The communication system according to claim 1, wherein a plurality of priority values in the priority message is determined according to a type of communication purpose of the user equipments transmitting the discovery messages, a type of public land mobile network or message strengths of the discovery messages.

8. The communication system according to claim 7, wherein the user equipments are informed of the message strengths of the discovery messages by a signal strength measurement.

9. A user equipment, comprising:
a transceiver, configured to transceive wireless data for communication by one of a plurality of carrier frequency bands; and
a processor, operatively coupled to the transceiver,
wherein the processor enables the transceiver to transmit a device-to-device communication request of the user equipment to a base station and obtains a resource pool message from the base station, wherein the resource pool message is configured to allocate a discovery resource pool of a predefined carrier frequency band to the user equipment in a group, and user equipments in the group are geographically close to one another,
wherein the processor enables the transceiver to transmit a discovery message of the user equipment in the discovery resource pool, and
the user equipment has a priority message corresponding to the discovery resource pool and selectively receives the discovery messages according to the priority message.

10. The user equipment according to claim 9, wherein the carrier frequency bands respectively belong to a plurality of mobile communication providers, and the user equipment uses a mobile communication service of one of the mobile communication providers,
wherein the processor enables the transceiver to transmit the discovery message corresponding to the user equipment's own according to the allocated discovery resource pool of the predefined carrier frequency band.

11. The user equipment according to claim 9, wherein the base station groups the user equipment into the group according to a location of the user equipment.

12. A user equipment, comprising:
a transceiver, configured to transceive wireless data for communication by one of a plurality of carrier frequency bands; and
a processor, operatively coupled to the transceiver,
wherein the processor enables the transceiver to transmit a device-to-device communication request of the user equipment to a base station and obtains a resource pool message from the base station, wherein the resource pool message is configured to allocate a discovery resource pool of a predefined carrier frequency band to the user equipment in a group, and user equipments in the group are geographically close to one another,
wherein the user equipment has a priority message corresponding to the discovery resource pool,
wherein the processor enables the transceiver to monitor the predefined carrier frequency band and selectively receives discovery messages of other user equipments according to the priority message.

13. The user equipment according to claim 12, wherein the carrier frequency bands respectively belong to a plurality of mobile communication providers, and the user equipment uses a mobile communication service of one of the mobile communication providers, wherein a part of user equipments among the other user equipments belongs to different mobile communication providers,
wherein the user equipment transmits the discovery message corresponding to the user equipment's own according to the allocated discovery resource pool of the predefined carrier frequency band.

14. The user equipment according to claim 12, wherein the priority message is preset in the user equipments.

15. The user equipment according to claim 12, wherein the base station provides the priority message to the user equipments by a synchronous transmission protocol.

16. The user equipment according to claim 12, wherein the discovery resource pool is divided into a plurality of resource blocks, and the priority message of the user equipment comprises a plurality of priority values respectively included for the resource blocks, wherein
the processor determines whether to receive and analyze the discovery messages within the resource blocks by the transceiver according to the priority values.

17. The user equipment according to claim 12, wherein a plurality of priority values in the priority message are determined according to a type of communication purpose of the user equipments transmitting the discovery messages, a type of public land mobile network or message strengths of the discovery messages.

18. The user equipment according to claim 17, wherein the user equipments are informed of the message strengths of the discovery messages by a signal strength measurement.

19. A base station, comprising:
a transmitter and a receiver, respectively configured to transceive wireless data for communication by one of a plurality of carrier frequency bands; and
a processing circuit, operatively coupled to the transmitter and the receiver,
wherein the processing circuit enables the receiver to obtain device-to-device communication requests of a plurality of user equipments by the carrier frequency bands, group the user equipments into a plurality of groups according to locations of the plurality of user equipments, and enables the transmitter to allocate a discovery resource pool within a predefined carrier frequency band to the user equipments in a same group, and
wherein each of the user equipments has a priority message corresponding to the discovery resource pool and selectively receives the discovery messages according to the priority message.

20. The base station according to claim 19, wherein the carrier frequency bands respectively belong to a plurality of mobile communication providers, and the plurality of user equipments use mobile communication services of the mobile communication providers, wherein a part of user equipments among the plurality of user equipments belongs to different mobile communication providers,
wherein each of the user equipments transmits a discovery message corresponding to each of the user equipments' own according to the allocated discovery resource pool of the predefined carrier frequency band.

21. The base station according to claim 19, wherein the user equipments in each group are geographically close to one another.

22. The base station according to claim 19, wherein the priority message is preset in the user equipments.

23. The base station according to claim 19, wherein the base station provides the priority message to the user equipments by a synchronous transmission protocol.

24. The base station according to claim 19, wherein the discovery resource pool is divided into a plurality of resource blocks, and the priority message of each of the user equipments comprises a plurality of priority values respectively included for the resource blocks,
wherein the user equipments determine whether to receive and analyze the discovery messages within the resource blocks according to the priority values.

25. The base station according to claim 19, wherein a plurality of priority values in the priority message is determined according to a type of communication purpose of the user equipments transmitting the discovery messages, a type of public land mobile network or message strengths of the discovery messages.

26. The base station according to claim 25, wherein the user equipments are informed of the message strengths of the discovery messages by a signal strength measurement.

27. A discovery method for device-to-device communication for a base station, comprising:
obtaining device-to-device communication requests of a plurality of user equipments by a plurality of carrier frequency bands, wherein the base station uses one of the carrier frequency bands to communicate with the user equipments;
grouping the user equipments into a plurality of groups according to locations of the user equipments; and
allocating a discovery resource pool within a predefined carrier frequency band to the user equipments in a same group,
wherein each of the user equipments has a priority message corresponding to the discovery resource pool and selectively receives the discovery messages according to the priority message.

28. The discovery method according to claim 27, wherein the carrier frequency bands respectively belong to a plurality of mobile communication providers, and the plurality of user equipments use mobile communication services of the mobile communication providers, wherein a part of user equipments among the plurality of user equipments belongs to different mobile communication providers,
wherein each of the user equipments transmits a discovery message corresponding to each of the user equipments' own according to the allocated discovery resource pool of the predefined carrier frequency band.

29. The discovery method according to claim 27, wherein the priority message is preset in the user equipments.

30. The discovery method according to claim 27, further comprising:
providing the priority message to the user equipments by a synchronous transmission protocol.

31. The discovery method according to claim 27, wherein the discovery resource pool is divided into a plurality of resource blocks, and the priority message of each of the user equipments comprises a plurality of priority values respectively included for the resource blocks,
wherein the user equipments determine whether to receive and analyze the discovery messages within the resource blocks according to the priority values.

32. The discovery method according to claim 27, wherein a plurality of priority values in the priority message is determined according to a type of communication purpose of the user equipments transmitting the discovery messages, a type of public land mobile network or message strengths of the discovery messages.

33. A discovery method for device-to-device communication for a user equipment, wherein the user equipment includes a transceiver, the discovery method comprising:
transmitting a device-to-device communication request of the user equipment to a base station by the transceiver;
obtaining an resource pool message from the base station by the transceiver, wherein the resource pool message is configured to allocate a discovery resource pool of a predefined carrier frequency band to the user equipment in a group, and the user equipments in the group are geographically close to one another;
transmitting a discovery message of the user equipment in the discovery resource pool by the transceiver, wherein the user equipment has a priority message corresponding to the discovery resource pool; and
monitoring the predefined carrier frequency band and selectively receiving discovery messages of other user equipments according to the priority message.

34. The discovery method according to claim 33, wherein a plurality of carrier frequency bands respectively belong to a plurality of mobile communication providers, and the user equipment uses a mobile communication service of one of the mobile communication providers,
wherein the user equipment transmits the discovery message corresponding to the user equipment's own according to the allocated discovery resource pool of the predefined carrier frequency band.

35. The discovery method according to claim 33, wherein discovery resource pool is divided into a plurality of resource blocks, and the priority message of the user equipment comprises a plurality of priority values respectively included for the resource blocks, wherein
the discovery method further comprises
determining whether to receive and analyze the discovery messages within the resource blocks according to the priority values.

* * * * *